(12) United States Patent
Doggett

(10) Patent No.: US 10,380,261 B2
(45) Date of Patent: Aug. 13, 2019

(54) CONVERSATIONAL LANGUAGE AND INFORMATIONAL RESPONSE SYSTEMS AND METHODS

(71) Applicant: Disney Enterprises, Inc., Burbank, CA (US)

(72) Inventor: Erika Varis Doggett, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/852,552

(22) Filed: Dec. 22, 2017

(65) Prior Publication Data

US 2019/0197106 A1 Jun. 27, 2019

(51) Int. Cl.
| | | |
|---|---|---|
| G06F 17/27 | (2006.01) |
| G10L 15/18 | (2013.01) |
| G10L 15/22 | (2006.01) |
| G06F 16/35 | (2019.01) |
| G06F 16/332 | (2019.01) |
| G06F 16/33 | (2019.01) |

(52) U.S. Cl.
CPC ...... *G06F 17/2785* (2013.01); *G06F 16/3329* (2019.01); *G06F 16/3344* (2019.01); *G06F 16/353* (2019.01); *G06F 17/2705* (2013.01); *G06F 17/277* (2013.01); *G10L 15/1815* (2013.01); *G10L 15/1822* (2013.01); *G10L 15/22* (2013.01)

(58) Field of Classification Search
CPC ............ G06F 17/2785; G06F 16/3329; G06F 16/3344; G06F 16/353; G06F 17/2705; G06F 17/30684; G06F 17/30707; G06F 17/30654; G06F 17/277; G10L 15/1815; G10L 15/22; G10L 15/1822
See application file for complete search history.

(56) References Cited

U.S. PATENT DOCUMENTS

| | | | | |
|---|---|---|---|---|
| 2017/0134313 A1* | 5/2017 | Poupart | ................... | H04L 51/02 |
| 2018/0181558 A1* | 6/2018 | Emery | .................. | G06F 17/279 |
| 2018/0365212 A1* | 12/2018 | Banerjee | ............... | G06F 17/279 |

* cited by examiner

*Primary Examiner* — Stella L. Woo
(74) *Attorney, Agent, or Firm* — Sheppard Mullin Richter & Hampton LLP

(57) ABSTRACT

Systems and methods for a computer-based, interactive communications system capable of generating a response to a human language input are provided. The computer-based, interactive communications systems includes a plurality of response models that may be selected to process one or more keywords extracted from the human language input. The plurality of response models may include at least one conversational response model and at least one informational response model, so that the computer-based, interactive communications system is able to respond to the human language input in a manner commensurate with the type of human language input it receives.

18 Claims, 5 Drawing Sheets

CONVERSATIONAL LANGUAGE AND INFORMATIONAL RESPONSE SYSTEMS AND METHODS

TECHNICAL FIELD

The present disclosure relates generally to computer-based, interactive communications systems.

DESCRIPTION OF THE RELATED ART

Computer-based communications, such as chatbots or similar interactive agents refer to computer programs that can conduct a conversation with a human counterpart. Such computer programs are designed to respond to textual and/or auditory (spoken) inputs in a way that attempts to convincingly simulate an actual human-to-human interaction. They may be used as virtual assistants, used on websites, used as part of instant messaging platforms, etc. Sometimes, these computer programs may be used for entertainment or research purposes. Sometimes, these computer programs may be used for promoting products and/or services.

BRIEF SUMMARY OF THE DISCLOSURE

In accordance with one embodiment, a computer-implemented method comprises receiving a language input, parsing the language input into one or more token segments, and classifying the token segments according to a response model for suitably generating a response to the token segments. The computer-implemented method further comprises determining whether the classification is suitable, and processing the token segments through one or more response models upon a determination that the classification is suitable. Further still, the computer-implemented method comprises determining whether a proposed response generated by the one or more response models is suitable, and generating the proposed response upon a determination that the proposed response is suitable.

In some embodiments, parsing the language input comprises correlating each of the one or more classification keywords with at least one of a plurality of response models. Moreover, a probability score can be assigned to each of the one or more classification keywords indicating a likelihood that each of the one or more classification keywords is properly correlated to the at least one of the plurality of response models.

In some embodiments, the computer-implemented method further comprises selecting the response model based upon meeting or exceeding a threshold determination confirming the likelihood that each of the one or more classification keywords is properly correlated to the at least one of the plurality of response models.

In some embodiments, the computer-implemented method further comprises determining whether a response can be generated based on the processing of the one or more classification keywords through the selected response model. The computer-implemented method may further comprise selecting an alternative response model upon a determination that the response cannot be generated.

In some embodiments, the computer-implemented method further comprises determining whether the generated response is suitable for the received language input. Moreover, an alternative response model can be selected upon a determination that the generated response is not suitable for the received language input.

In some embodiments, the response model comprises one of a language general model or an informational response model. In some embodiments, the response model comprises at least one of a plurality of language generation models or at least one of a plurality of informational response models.

In some embodiments, the computer-implemented method comprises translating the one or more keywords into a data query format upon selection of the at least one of the plurality of informational response models.

In some embodiments, the computer-implemented method further comprises querying a knowledge database and retrieving a factual response to the formatted data query.

In some embodiments, the computer-implemented method further comprises translating the factual response into a conversational response to be output as the generated response.

In accordance with one embodiment, an apparatus comprises a processor and a memory unit operatively connection to the processor. The memory unit includes computer code configured to cause the processor to: receive a language input from a human user; parse the language input to determine one or more keywords; based on at least one of the one or more keywords, select at least one response model from a plurality of response models; process the one or more keywords through the selected response model; and generate a conversational response to received language input.

In some embodiments, the computer code further causes the processor to assign a probability value to each of the one or more keywords indicative of a likelihood that the respective keyword to which the probability value is assigned should be processed by one of the plurality of response models.

In some embodiments, the computer code further causes the processor to confirm selection of the at least one response model by comparing at least one of the probability values assigned to each of the one or more keywords to a threshold.

In some embodiments, the at least one response model comprises a response model adapted to generate a conversational response simulating a human response to the language input.

In some embodiments, the at least one response model comprises a response model adapted to return a knowledge-based response.

In some embodiments, the computer code further causes the processor to translate the knowledge-based response into a conversational response simulating a human response to the language input.

In some embodiments, the language input comprises at least one of an auditory input and a textual input.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As alluded to above, conventional chatbots or other interactive communications systems are often designed to simulate human-to-human interactions. That is, such systems are configured to provide responses to human language inputs in a manner that is as natural as possible, e.g., a human user may present a statement to which such systems may respond with a "natural" sounding response. For example, an interactive communications system may respond to a language input of "Hello" with the response, "Hi. How are you?" However, such systems can falter when presented with a question that requires some knowledgeable response.

That is, conventional interactive communications systems are typically developed with a focus on responding in a conversational style, rather than an ability to respond with facts, data, or other knowledge. Moreover, some interactive communications systems may be designed to accept knowledge-based questions that are phrased in a conversational style (as opposed to, e.g., a Boolean-style query). However, such systems are limited to parsing the question, performing a search based on one or more keywords extracted from the question, and returning a plurality of search results. In other words, such systems merely provide a conversational input interface to a conventional search engine.

Accordingly, various embodiments described in the present disclosure are directed to an interactive communications system that is capable of providing both conversational responses, e.g., natural language-sounding responses purely for conversation's sake, as well natural language-sounding responses for knowledge-based, information's sake. Moreover, various embodiments described in the present disclosure are directed to determining the "suitability" or "appropriateness" of these natural language-sounding responses. That is, one or more thresholds and/or filters may be used to judge whether or not a response will properly address a user's language input.

Figure 1:
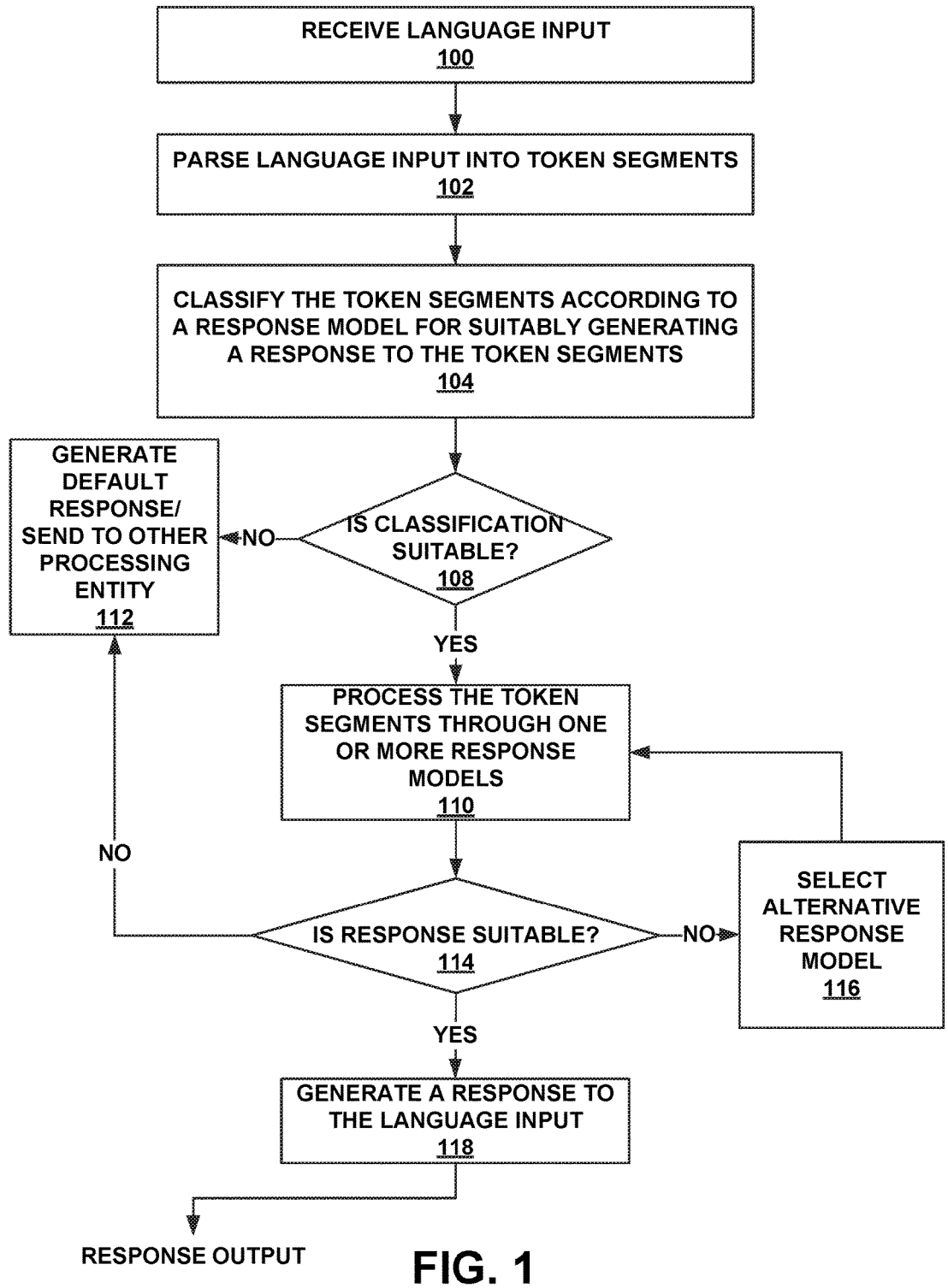
FIG. 1 is a flow chart illustrating example operations that can be performed to effectuate computer-based communications in accordance with one embodiment.

FIG. 1 is a flow chart illustrating example operations that may be performed to effectuate a computer-based, interactive communications system in accordance with various embodiments. At operation 100, a language input may be received. As previously noted, a computer-based, interactive communications system may comprise a chatbot, an instant messaging system, a virtual assistant, or other computer-based application. Accordingly, the language input may be an auditory and/or text-based input received through a user interface.

Figure 2A:
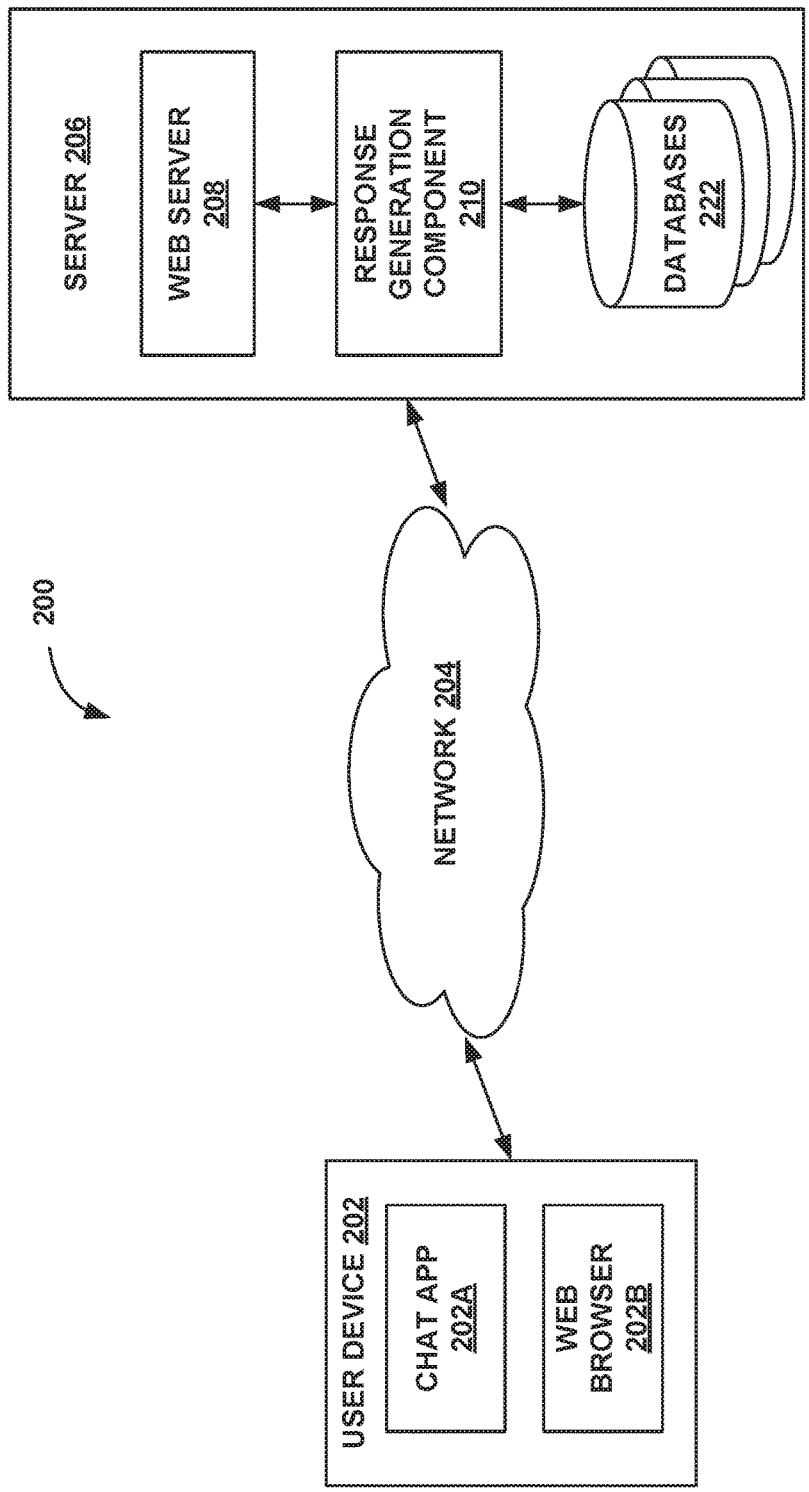
FIG. 2A is a schematic representation of an example architecture of an interactive communications system in accordance with one embodiment.

For example, and referring to FIG. 2A, in an architecture of a computer-based, interactive communications system 200, the user interface may be implemented as part of a web-based chat application 202A that is running on a user device 202. The user interface may provide a mechanism for a user of user device 202 to compose or otherwise submit a language input, such as a chat window configured to receive one or more statements, phrases, questions, or other forms of language input. User device 202 (in which chat application 202A is running) may be operatively connected to a microphone (not shown) or other auditory-gathering device. The microphone or auditory-gather device can be used for receiving spoken language input. User device 202 may be a smartphone, laptop computer, tablet computer, or other computing device.

In some embodiments, the conversational aspect/functionality of the computer-based, interactive communications system 200 may be provided by a remote server 206 in conjunction with databases 222 vis-à-vis a response generation component 210. Databases 222 may comprise one or more corpora or other data sources upon which processing of a language input can be based. For example, databases 222 may be an informational response, e.g., knowledge database or other information repository accessed by response generation component 210 to retrieve data to be included in a response to a language input. Databases 222 may also be a corpus of response phrases that response generation component 210 may access in order to retrieve an appropriate or suitable phrase or word(s) in response to a language input. Further still, databases 22 may comprise one or more word vocabularies that a machine learning generation model may reference to generate a suitable response.

To access response generation component 210 implemented on server 206, chat application 202A may communicate with response generation component 210 via web browser 202B, which in turn may communicate with web server 208 over a network 204. For example, chat application 202A may be part of an online game, online chat service, or online information service provided by an online service provider operating server 206.

Network 204 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 204 may employ various communication media, such as a coaxial cable, fiber optic cable system, Ethernet, radio waves, etc. Further still, network 204 may be one or more combinations of any of the aforementioned networks.

Other approaches for online-based operations may be used, or interactive communications system 200 may be implemented as a local and/or stand-alone application or service resident, for example on user device 202. That is, response generation component 210 and databases 222 may be implemented on user device 202. In still other embodiments response generation component 210 may be locally implemented on user device 202, while databases 222 may be remotely located and accessed, e.g., via network 204 or one or more other networks. Regardless of where/how response generation component 210 is implemented, upon receiving the language input from a user via chat application 202A, chat application 202A can forward the language input to response generation component 210 to be processed as follows.

Returning to FIG. 1, the language input may be parsed into suitable or appropriate word or token segments, which may include additional language information such as classification keyword identification, part-of-speech category, syntactic relational category, content versus function word identification, conversion into semantic vectors, among others. It should be noted that in some instances, parsing can refer to removing certain words to arrive at a suitable token segment, e.g., removing stop words, performing lemmatization, stemming, etc.

In accordance with various embodiments, different response systems or models may be used to generate a response to a language input (described in greater detail below). Thus, various embodiments contemplate classifying the aforementioned token segments in order to determine what response system or model should be used to generate a suitable response. Accordingly, once one or more token segments are extracted from the language input, the one or more token segments may be input into a classification model (represented as classifier component 214 of FIG. 2B) That is, at operation 104, the token segments are classified according to a response model for suitably generating a response to the token segments.

A classification model could be of a simple or complex nature. In some embodiments, the classification model may count how many "conversational" keywords appear in the parsed token segments and how many "informational" keywords appear. In some embodiments, a trained, supervised neural network classification model operating over semantic vectors can be used to predict the "conversational" or "informational" nature of the token segments.

It should be noted that the manner in which classification of the token segments occurs can vary. In some embodiments, each token segment may be analyzed using the classification model, resulting in each token segment being associated with a particular response system or model. In some embodiments, each token segment may be analyzed, but considered as a whole (parsed language input) when ultimately classified/associated with a particular response system or model. For example, more token segments may be classified as being associated with an informational response model, e.g., classifier component 214 determines the suitable response to the token segments is informational in nature. In this case, the parsed language input as a whole may be classified as necessitating an informational response.

For example, if a language input comprises a conversational statement or phrase, such as "How's it going?" the words "how", "'s", and "going" may be extracted as potential tokens. For a simple keyword classification model, these tokens may be deemed to be indicative of conversational type keywords or belong to a conversational class of keywords. If a language input comprises a fact-seeking query or phrase, such as "Who won the 1962 World Series?" the terms "won, "1962," and "World Series" may be extracted as tokens, and deemed to be informational response type keywords or belong to a informational response class of keywords. For a more complex classification model, for example a neural network or Support Vector Machine, the tokens "how", "'s", "going" and "won", "1962", "World Series" may be converted into semantic vectors, and the model may evaluate the category based on those vector features and its prior training with regards to those features.

The classification model may assign a "conversational" or "informational" category to the input, or it may assign a scalar value for "conversational-ness" or "informational-ness." Depending on the embodiment, a threshold may be set for the resulting scalar value, to determine whether a conversational or informational response is warranted. That is, at operation 108, a check can be performed to determine whether the classification is suitable. Here, suitable can refer to meeting or exceeding some threshold determination for classification. For example, if a scalar value of 0.4 is provided for "conversational-ness," and the threshold setting is a scalar value of 0.6, the input associated with the scalar value 0.4 is deemed not to be indicative of an appropriate or suitable classification of the input as being conversational.

If the classification is deemed suitable, the token segments may be processed through one or more of the suitable response models at operation 110. It should be understood that in some instances, the token segments can be processed through more than one response model, e.g., both conversational and informational response models (218A and 218B, respectively of FIG. 2B). This can occur, for example, if the language input contains token segments that should legitimately be responded to with both types of response models. Alternatively, if the classification model does not produce a high enough scalar value to meet a threshold for either "conversational" or "informational" category, for example, the system may be set to produce responses for both, using the conversational and informational response models. In some embodiments, the system may generate a default or set response indicating uncertainty (e.g., "I don't understand what you just said.") or asking for clarification (e.g., "Could you re-phrase that for me?") at operation 112. Alternatively still, another processing entity, e.g., a human actor, can be used to process the token segments in order to generate a suitable response at operation 112.

In some embodiments, a "pure" conversational system or model may be used in conjunction with an informational response system or model. In this way, and in contrast to conventional interactive communications systems, various embodiments are able to respond to language inputs even when a proper response involves some fact(s), data(s), or other knowledge. Accordingly, at operation 110, an informational response model may be selected for processing the token segments.

Various embodiments contemplate the ability to check or verify the validity of a generated response. That is, at operation 114, a check can be performed to determine whether or not a potential response based on one or more response models is suitable. In some embodiments, the generated response may be checked against the language input to ensure, to some degree of confidence, the appropriateness or suitability of the response. For example, the phrase "Today it will be sunny and 75°" in response to a language input of "Hi. How are you?" would be deemed to be an inappropriate response. This could also be implemented in another classification model by instead, assigning "appropriate" and "inappropriate" categories based on the language input-proposed output combination. Such a classification model could take the form of a trained machine learning model, or could be implemented through a keyword or rule-based system, or still other mechanisms.

In some embodiments, a weighting system may be used, where the suitability or appropriateness determination may be assigned some confidence level. In the case of the confidence level being non-determinative (e.g., the proposed language response is deemed to be 50/50 appropriate or inappropriate), the system may be configured to react in accordance with a variety of behaviors depending on the preference(s) of a system designer. For example, in some embodiments, the system may move forward with using a proposed language response despite a lack of confidence in its appropriateness. In some embodiments, the system may switch to the other language response model at operation 116. That is, if the non-determinative response was from the conversational model, the informational model would be selected to process the token segments. That response could then be checked for its appropriateness. Additionally, as previously discussed, a default or set response (e.g. "I'm not sure how to respond; can you please re-phrase that?") could be provided to the user. In this way, a variety of behaviors can be implemented depending on the check to determine whether or not a response is appropriate.

If the "conversational" vs. "informational" classification threshold is met and the response is deemed appropriate, at operation 118, a response to the language input is generated. Referring back to FIG. 2A, response generation component 210 communicates the generated response to web server 208, which may then relay the generated response back to user device 202. The generated response may be presented to the user of user device 202 via chat application 202A. The generated response can be presented in the same format in which the language input was received. For example, if the user of user device 202 submitted the language input through chat application 202A via text-based input, the generated response can also be output as text-based output. In some embodiments, chat application 202A may present or output the generated response in a format different from that with which the language input was received. For example, if the user of user device 202 submitted the language input through chat application 202A via text-based input, the generated response may be output in some auditory form, e.g., spoken back to user through one or more speakers in user device 202. Accordingly, chat application 202A and/or user device 202 may have a text-to-speech conversion component implemented therein.

Figure 2B:
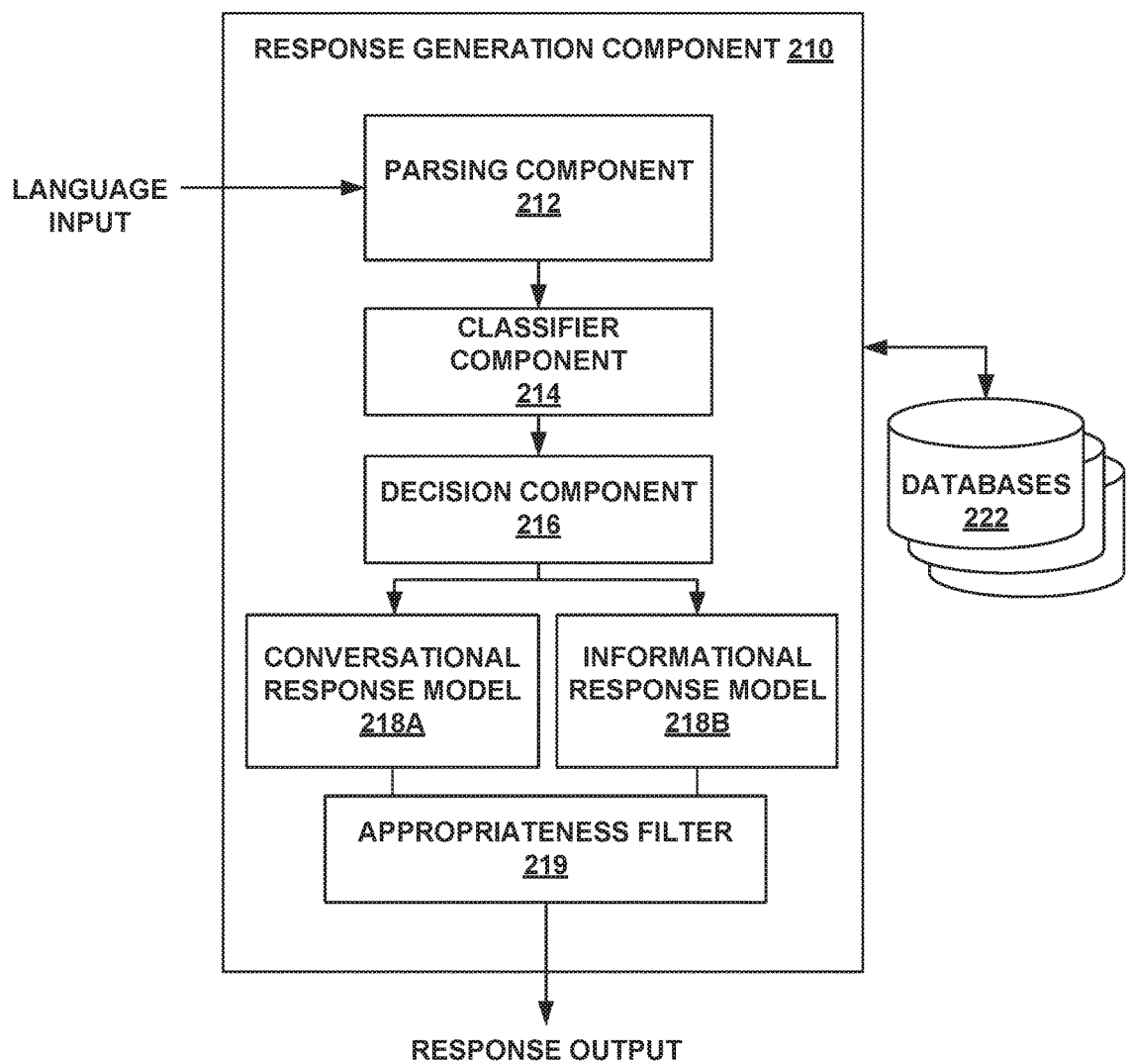
FIG. 2B is a schematic representation of an example language generation system of the computer-based communications system of FIG. 2A.

FIG. 2B illustrates response generation component 210 in greater detail. As illustrated in FIG. 2B, response generation component 210 may comprise a parsing component 212, a classifier component 214, a decision component 216, a language generation model 218A (which may be an embodiment of the aforementioned "pure" conversational model), and a informational model 218B. Response generation component 210 may further comprise an appropriateness filter 219.

As discussed above, response generation component 210 may receive a language input, where the language input is a phrase, question, statement, or other collection of words. That language input may be parsed to extract one or more token segments by parsing component 212. In some embodiments, parsing component 212 may be a program configured to operate in accordance with one or more algorithms designed to separate the language input into its component parts. These component parts may be, for example, words, numbers, smaller phrases, etc. that can be used to identify the grammatical structure and meaning of the language input. One of ordinary skill in the art would understand that different parsing algorithms and/or a combination of different parsing algorithms may be used to achieve the desired parsing in accordance with various embodiments. Some examples of parsing algorithms include, but are not limited to those that are based on lexical functional grammar, head-driven phrase structure grammar, dependency grammar, etc.

Once a language input has been parsed into its component parts, classifier component 214 may make a determination as to which response model should be used to generate an appropriate or suitable response. In the illustrated example of FIG. 2B, classifier component 214 may make a determination whether the response model is a language generation model, e.g., conversational response model 218A, or an informational response model, e.g., informational response model 218B. The manner in which classifier component 214 is implemented may vary in accordance with different embodiments.

In some embodiments, classifier component 214 may be implemented as a "hardcoded" algorithm/software in which matching operations can be performed to match one or more keywords resulting from the parsing process with keywords correlated to, in this example, either conversational response model 218A or informational response model 218B. In this way, the response model to be used can be determined based solely on the tokens themselves.

In some embodiments, classifier component 214 may be a trained machine learning classification model. That is, classifier component 214 may be trained with one or more corpora deemed to fall within, in this case, a conversational type of language input/tokens or an informational type of language input/tokens. One of ordinary skill in the art would understand that different training mechanisms may be used resulting in a classifier component that can be based on, e.g., a random forest model, a support vector machine, a neural network, etc. that utilize algorithms such as logistic and/or linear regression to predict in what class a language input/tokens may belong.

It should be understood that classifier component 214 can, in some embodiments, be trained to operate with a variety of different response models, e.g., different types or implementations of a language generation model, different types or implementations of an informational response model. For example, different informational response models may exist and may be used depending on a determined subject of interest. For example, different response models, based on their method of operation, may be suited for different language inputs.

It should also be understood that although two response models are illustrated in FIG. 2B and described, embodiments of the present disclosure are not limited to the use of just two response models. Parsing component 212, classifier component 214, and decision component 216 (described below) can be adapted to work with any number of response models.

As noted above, in some embodiments, a weighting system may be used, where a classification determination may be assigned some confidence level or scalar value. Classifier component 214 may be configured to make such a prediction/initial determination regarding the tokens parsed from the language input. In some embodiments the assigned scalar value may be probability score or value that is associated with each of input tokens. Depending on whether a token is more likely to be associated with one of the plurality of response models, classifier component 214 may output an appropriate or suitable determination. In some embodiments classifier component 214 may make this determination based upon an aggregate probability score. For example, in a simple keyword-based classifier, an input like "How's it going" may be parsed and the tokens "'s", "it", and "going" may each receive a "conversational" score mark of 1, for a total "conversational" score of 3 out of 4 words, or 0.75. The token "How" may receive an "informational" score of 1, for a total "informational" score of 1 out of 4 words, or 0.25. In other embodiments, the classifier component 214 may make this determination based on interactions between different token probabilities, and token combination probabilities. In still other embodiments, the classifier component 214 may make this determination based on semantic vector features and the computed probabilities associated with vectors during training of the classifier model.

The initial determination to generate a response with a particular response model can be refined by decision component 216. In some embodiments, decision component 216 may be a comparator that compares the probability score assigned by classifier component 214 to a threshold. The comparison may be used to ultimately determine which response model is used to generate a response to the language input. For example, one token parsed from the language input may be assigned a probability score indicating that there is a 40% probability that it warrants a conversational response. Another token parsed from the language input may be assigned a probability score indicating that there is an 80% probability that it warrants an informational response. Decision component 216 may, based, for example, on a 51% probability threshold, determine that a knowledge-based response should be generated by informational response model 218A. The thresholds used by decision component 216 can vary and/or be adapted for different scenarios.

As noted previously, some embodiments may use multiple response models of a particular type. Following the above example, if decision component 216 determines that an informational response model should be used to generate a response to the language input, and multiple informational response models are implemented, each of the multiple informational response models can generate a response. Each of the responses may then be analyzed to determine the most appropriate response, using the appropriateness or suitability filter 219 (described above).

Upon selecting a response model to generate a response to the language input, the selected response model, in this example, either conversational response model 218A or informational response model 218B processes the parsed language input. Conversational response model 218A may comprise any known conversational-centric response model. In some embodiments, conversational response model 218A may comprise one or more corpora of scripted dialogue responses that can be correlated with tokens parsed from the language input by parsing component 212. Such a model can be referred to as a retrieval-based model. In some embodiments, conversational response model 218A may be, e.g., a generative chat model based on generative neural network models that may generate a novel response, word by word, rather than a scripted phrase. Other types or forms of conversational response models may be used in accordance with various embodiments.

Figure 2C:
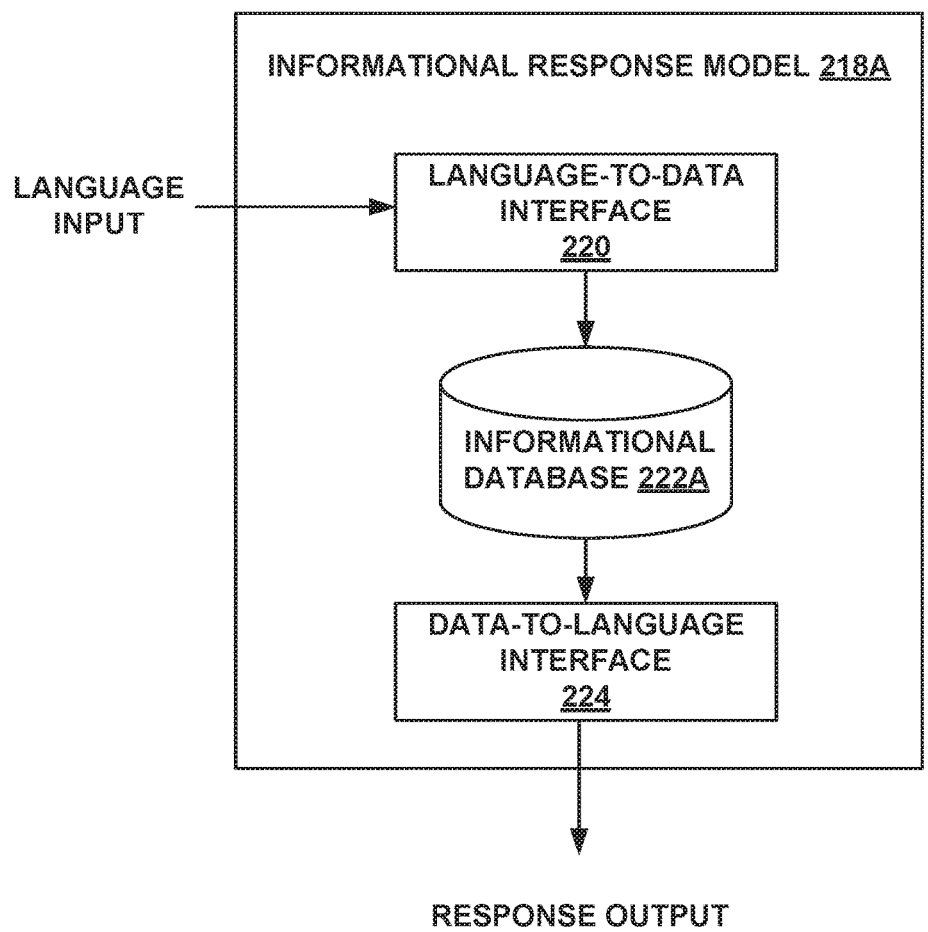
FIG. 2C is a schematic representation of an example informational response model that may be used in the computer-based communications system of FIG. 2A.

FIG. 2C is a schematic representation of an example informational response model, for example, informational response model 218A. Because conventional informational response models are configured to provide a factual or data-centric response to some language input, such as a query for some information, the generated response of conventional informational response models may be deemed awkward by human interacting with the interactive communications system 200. Accordingly, in some embodiments, informational response model 218A may implement a language-to-data interface 220 and a data-to-language interface 224. Language-to-data interface 220 may translate received language input into data that can be recognized by informational database 222A (which may be an embodiment of one of the one more databases 222). It should be understood that informational response model 218A may access and/or be associated with more than one informational database as previously discussed. Upon receiving the translated data, informational database 222A can provide an appropriate fact or data that can be used in the generated response to the language input. The data retrieved by informational database 222A may be processed through a data-to-language interface 224 to translate the retrieved data into a more natural language-sounding response.

It should be noted that in some embodiments, processing can move between informational response model 218B and conversational response model 218A. As previously discussed with respect to FIG. 1, some scenarios may involve selecting an alternative response model. Accordingly, one or more evaluative metrics (such as those described above in the context of determining classification probability) can be used to ascertain the validity or appropriateness of a generated response. It should be understood that in some embodiments, such an evaluation can be performed prior to generation of a response or after generation of a response. For example, informational response model 218B may be used to retrieve facts/data in response to the language input. In some embodiments, these facts/data may be evaluated to determine if their inclusion would result in an appropriate response. In other embodiments, the evaluation can be performed after an actual response has been generated by informational response model 218B.

Figure 3:
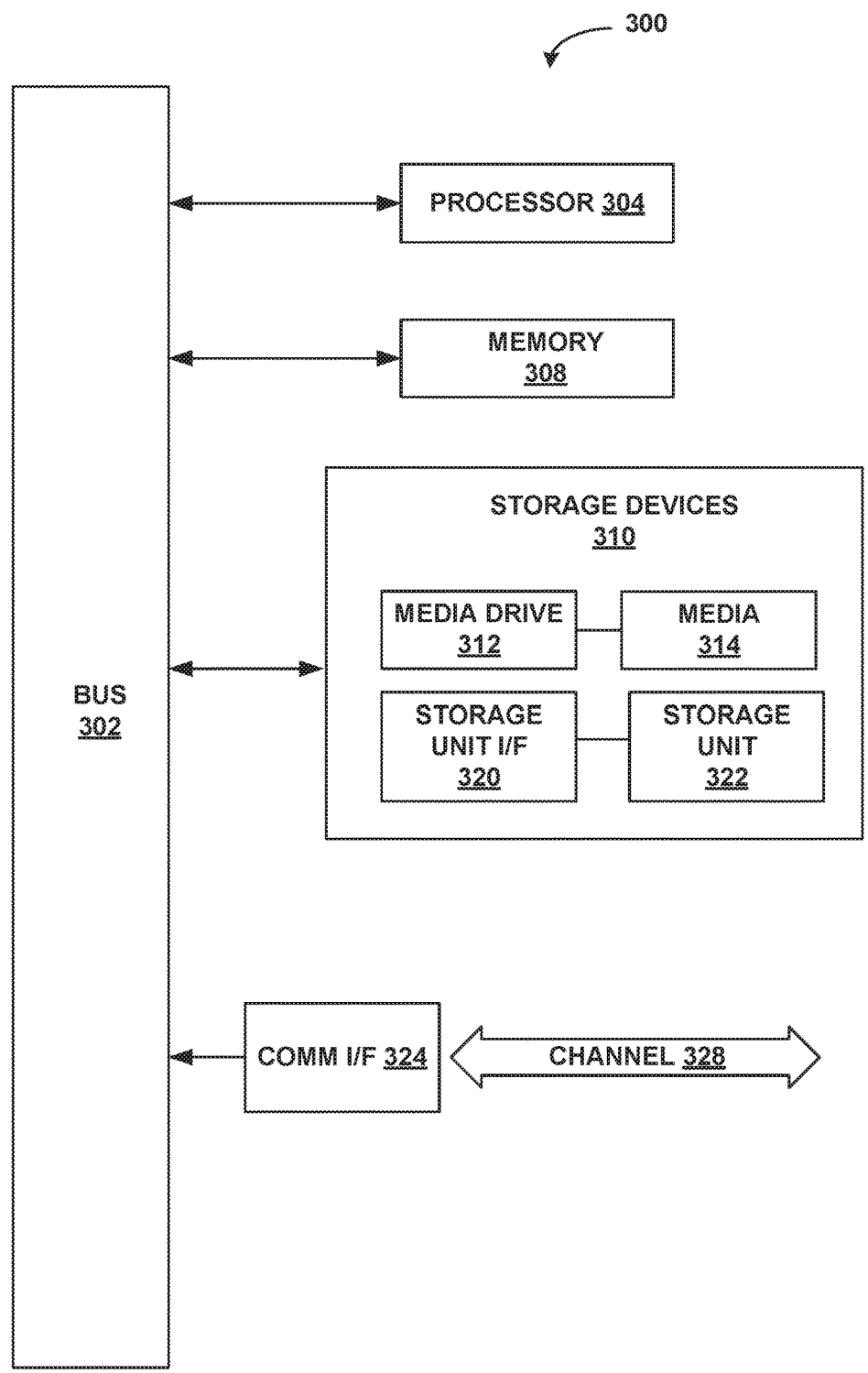
FIG. 3 is an example computing component that may be used to implement various features of embodiments described in the present disclosure.

FIG. 3 illustrates an example computing component that may be used to implement various features of the system and methods disclosed herein, such as the aforementioned features and functionality of one or more of user device 202, server 206, response generation component 210 and/or any of their respective component parts.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Computing component 300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 300 might also represent computing capabilities embedded within or otherwise available to a given device. For example, a computing component might be found in other electronic devices such as, for example navigation systems, portable computing devices, and other electronic devices that might include some form of processing capability.

Computing component 300 might include, for example, one or more processors, controllers, control components, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing component 300 or to communicate externally.

Computing component 300 might also include one or more memory components, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing component 300 might likewise include a read only memory ("ROM") or other static storage device coupled to bus 302 for storing static information and instructions for processor 304.

The computing component 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 314 might include, for example, a hard disk, an integrated circuit assembly, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot, a PCMCIA slot and card, and other fixed or removable storage units 322 and interfaces 320 that allow software and data to be transferred from the storage unit 322 to computing component 300.

Computing component 300 might also include a communications interface 324. Communications interface 324 might be used to allow software and data to be transferred between computing component 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
receiving a language input;
parsing the language input into one or more token segments;
classifying the token segments according to a response model for suitably generating a response to the token segments;
determining whether the classification is suitable;
processing the token segments through one or more response models upon a determination that the classification is suitable;
determining whether a proposed response generated by the one or more response models is suitable; and
generating the proposed response upon a determination that the proposed response is suitable;
wherein parsing the language input comprises correlating each of the one or more classification keywords with at least one of a plurality of response models, and wherein the at least one response model comprises at least one of a plurality of language generation models.

2. The computer-implemented method of claim 1, further comprising assigning a probability score to each of the one or more classification keywords indicating a likelihood that each of the one or more classification keywords is properly correlated to the at least one of the plurality of response models.

3. The computer-implemented method of claim 2, further comprising selecting the response model based upon meeting or exceeding a threshold determination confirming the likelihood that each of the one or more classification keywords is properly correlated to the at least one of the plurality of response models.

4. The computer-implemented method of claim 1, further comprising, determining whether a response can be generated based on the processing of the one or more classification keywords through the selected response model.

5. The computer-implemented method of claim 4, further comprising selecting an alternative response model upon a determination that the response cannot be generated.

6. The computer-implemented method of claim 1, further comprising determining whether the generated response is suitable for the received language input.

7. The computer-implemented method of claim 6, further comprising selecting an alternative response model upon a determination that the generated response is not suitable for the received language input.

8. The computer-implemented method of claim 1, wherein the response model comprises one of a language general model or an informational response model.

9. The computer-implemented method of claim 1, further comprising translating the one or more keywords into a data query format upon selection of the at least one of the plurality of informational response models.

10. The computer-implemented method of claim 9, further comprising querying a knowledge database and retrieving a factual response to the formatted data query.

11. The computer-implemented method of claim 10, further comprising translating the factual response into a conversational response to be output as the generated response.

12. An apparatus, comprising:
a processor; and
a memory unit operatively connection to the processor, the memory unit including computer code configured to cause the processor:
receive a language input from a human user;
parse the language input to determine one or more keywords;
based on at least one of the one or more keywords, select at least one response model from a plurality of response models, wherein the at least one response model comprises at least one of a plurality of language generation models;
process the one or more keywords through the selected response model; and
generate a conversational response to received language input.

13. The apparatus of claim 12, wherein the computer code further causes the processor to assign a probability value to each of the one or more keywords indicative of a likelihood that the respective keyword to which the probability value is assigned should be processed by one of the plurality of response models.

14. The apparatus of claim 12, wherein the computer code further causes the processor to confirm selection of the at least one response model by comparing at least one of the probability values assigned to each of the one or more keywords to a threshold.

15. The apparatus of claim 12, wherein the at least one response model comprises a response model adapted to generate a conversational response simulating a human response to the language input.

16. The apparatus of claim 12, wherein the at least one response model comprises a response model adapted to return a knowledge-based response.

17. The apparatus of claim 16, wherein the computer code further causes the processor to translate the knowledge-based response into a conversational response simulating a human response to the language input.

18. The apparatus of claim 12, wherein the language input comprises at least one of an auditory input and a textual input.

* * * * *